United States Patent [19]

Kettler

[11] 4,330,827
[45] May 18, 1982

[54] AIRCRAFT AUTOPILOT SYSTEM

[76] Inventor: Douglas L. Kettler, 1212 N. Broadway, Apt. H, Escondido, Calif. 92026

[21] Appl. No.: 135,327

[22] Filed: Mar. 31, 1980

[51] Int. Cl.³ .................... G05D 1/12; B64C 13/18
[52] U.S. Cl. .............................. 364/428; 343/108 R; 244/186
[58] Field of Search ............... 364/428; 244/183, 185, 244/186, 187; 318/583, 584; 343/5 LS, 108 R; 73/178 T, 178 R; 340/27 NA, 27 R

[56] References Cited

U.S. PATENT DOCUMENTS

| | | | |
|---|---|---|---|
| 3,626,163 | 12/1971 | Dommasch | 343/108 R |
| 3,801,049 | 4/1974 | Simpson et al. | 343/108 R |
| 3,847,328 | 11/1974 | Simpson et al. | 343/108 R |
| 3,887,148 | 6/1975 | Devlin | 343/108 R |
| 3,892,373 | 7/1975 | Doniger | 244/186 |
| 3,994,455 | 11/1976 | Simpson | 244/186 |
| 4,164,340 | 8/1979 | Simpson | 343/108 R |

*Primary Examiner*—Mark E. Nusbaum
*Assistant Examiner*—Gary Chin

*Attorney, Agent, or Firm*—George J. Netter

[57] ABSTRACT

In an aircraft autopilot there is provided a first circuit selectively actuatable to connect the glide slope adapter to electrical power during the existence of a glide deflection signal, the glide slope adapter being disconnected from electric power when either (a) the altitude hold is inoperative, or (b) the altitude hold is operative and at least one of the following exists: the radio switch LOC NORM is off, or glide slope coupling has been achieved; a second circuit for maintaining the autopilot under control of a preset heading on the pictorial navigation indicator when the radio coupler is preset for radio navigation control including a third circuit for placing the automatic pilot under control of the radio coupler and interrupting heading control by the pictorial navigation indicator upon actual intercept of the omni occurring; and a selectively actuatable fourth circuit for disconnecting the console pitch signal from the amplifier and interconnecting a pitch signal of predetermined fixed magnitude to the amplifier, and simultaneously energizing a signal light.

6 Claims, 6 Drawing Figures

AIRCRAFT AUTOPILOT SYSTEM

The present invention relates generally to aircraft autopilot systems, and, more particularly, to improvements in such systems used in relatively small, privately owned aircraft enhancing ease of use and safety.

BACKGROUND OF THE INVENTION

An autopilot system for aircraft includes, in its most general contemplation, a gyroscopic device interconnected to the aircraft flight controls via servosystems for automatically controlling flight in accordance with predetermined heading and altitude settings. In domestic or privately owned aircraft, these autopilot systems, whether of the so-called two axis or three axis variety, provide means for presetting the aircraft to any desirable heading (i.e., compass heading) and the system will automatically maintain the aircraft on the heading until affirmatively commanded to either manual control or to some other heading. Other more sophisticated systems also provide the capability of maintaining a preselected altitude.

A still further option available in certain known autopilots is the ability to be able to intercept and track the aircraft down along ground-based radio beams from a landing field, or so-called instrument landing systems (ILS) beams, for use in aiding landing of the aircraft. In this way, the aircraft is capable of automatic landing under the control of the autopilot. In explanation, the instrument landing system (ILS) provides an approach path for exact alignment and descent of an aircraft on its final approach to the landing field runway. The ground equipment typically provides two transversely spaced, highly directional, high-frequency beams emanating upwardly along a preferred slope for landing an aircraft, and, along the approach, two or more marker beacons identifying the radial distance to the landing field measured along the ground. The autopilot system in the aircraft will then, upon being properly armed, intercept the ILS beams and bring the aircraft down along the proper descent approach defined by the beams to the landing field or runway.

One difficulty which is encountered in known autopilot equipment providing glide slope interception and tracking is that a basic condition for operation is the aircraft must be maintained 60 percent under the glide slope for a predetermined minimum interval of time (e.g., 20-40 seconds) before the autopilot equipment is armed. In view of the relatively crowded conditions which obtain in airfields at the present time, the required 20-40 second waiting time may frequently be neither convenient nor practical for the pilot, and because of the traffic the pilot may have to interrupt the system and take over manually several times before he is locked onto the beam in an autopilot controlled approach.

There are several situations where it is necessary for the pilot to make a "go-around" rather than proceed on and land. For example, because of other traffic in the area, the aircraft may have to be diverted from its approach and start all over again, in which case, in the usual situation, the aircraft circles the field and comes back in for a further landing attempt along the same heading as originally. For a standard go-around using conventional autopilot systems, the pilot during the coupled approach, just has to set the unmarked pitch command wheel (controlling angle of descent and ascent) in a position which is considered will provide a proper "pitch up" or attitude in the event it is necessary to disengage that part of the autopilot system which maintains the altitude at a predetermind value. Accordingly, the pitch is not always the same and also the command wheel is susceptible to being inadvertently moved which can result in either (1) a pitch up to a higher altitude while the aircraft is at a relatively low airspeed exposing the aircraft to the possibility of stalling, or (2) pitching the aircraft to a lower altitude when the aircraft is already close to the ground with the obvious risk of crashing. Moreover, since to make a go-around the pilot must turn off the altitude maintenance part of the autopilot system in order to make the go-around, the attention of the pilot is diverted at a critical time of the approach.

Still further, many autopilot systems also have the capability of slaving the autopilot to follow a preselected radio beam frequently referred to as an omni radial or just omni (short for omnidirectional radio beam). These highly directional beams are radiated in predetermined directions away from a transmitter (e.g., at a landing field) not unlike spokes in a wheel, and, if followed, will move the aircraft along a precise map heading. When an aircraft comes into range of a desired omni, it will usually have to make a turn in order to intercept the omni, and when using an autopilot system the turn is made until the aircraft effects actual intercept at a forty-five degree angle. Of course, with a moving aircraft, this turning can encompass a relatively large area which poses no difficulty if there is no air traffic in the immediate area, or the controller has not commanded the aircraft to stay on a particular heading, or there are no other obstacles preventing the turn. However, a frequent occurrence is that air traffic control directs the pilot to stay on a particular heading mode, and the pilot must at the same time, watch for the navigation indicator needle to center (indicating that the desired omni radial is being approached) before he can switch to the navigational mode of the autopilot. During this entire changeover period, the pilot must also be watching for air traffic in the area and performing what other duties may be required in the aircraft, all of which may result in the pilot having more to do than he can conveniently (or safely) accomplish.

SUMMARY OF THE INVENTION

In accordance with a first aspect of the present invention, there is provided apparatus for cooperative interaction with an aircraft autopilot for interrupting automatic operation and manually commanding the autopilot to couple the glide slope during approach for landing under ILS. In this first aspect, circuit controls are provided preventing premature coupling if the aircraft is either too far below or too far above the required glide slope thereby enabling safe interception and tracking along the glide slope. In this manner, the pilot can make a glide slope coupling with the autopilot every time.

According to a further aspect of this invention, apparatus is provided interconnected with and coacting with the autopilot of an aircraft for providing a pitch-up signal corresponding to a predetermined desired angle which will cause the aircraft to reassume automatically that angle whenever a coupled approach is broken off and it is determined that a fly-around or go-around is necesary. In addition, when the pilot reaches the desired altitude or pattern altitude, he can manually command the equipment to maintain the attitude at the new altitude. In this way, the pilot workload is substantially reduced during a critical period and a safe pitch attitude for the aircraft is maintained during changeover to go-around.

In a still further aspect of the invention, when it is desired to have the autopilot follow a selected omni radial, means are provided for electronically monitoring the navigational indicator and automatically switch from a heading course to navigation when the indicator shows some predetermined amount of deflection (e.g., ¼ to ½ scale deflection).

DESCRIPTION OF A PREFERRED EMBODIMENT

Figure 1:
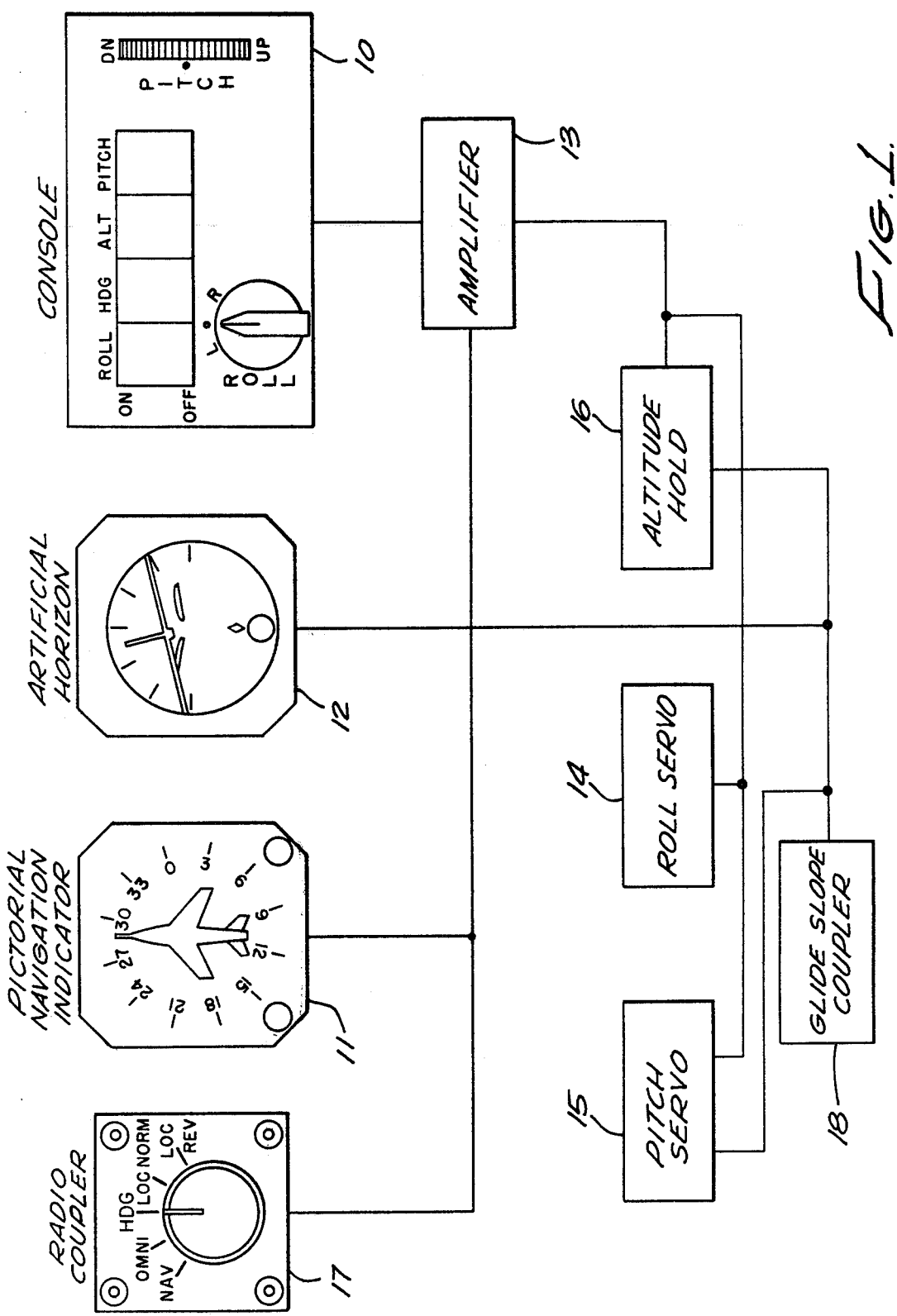
FIG. 1 is a function block diagram of a typical automatic pilot system of the prior art.

Turning now to the drawings and particularly FIG. 1, there is shown a function block diagram of a typical autopilot system for the automatic control of an aircraft in flight. In its most general terms, such an autopilot system includes a gyroscope which provides electrical pickoff signals functionally related to the degree of change from an initial orientation of the gyroscope. These signals are used to power servosystems which are interconnected with the various controls of the aircraft, moving them in a proper direction to maintain predetermined heading, altitude or other condition of the aircraft. Such autopilot systems have been known for some time, one example of which is a system sold under the trade styles Century III or Altimatic IIIC manufactured by Edo-Aire Mitchell, Mineral Wells, Tex., which is a three-axis autopilot system, namely, for controlling heading, roll and pitch of an aircraft automatically.

Although it is beyond the scope of the description given herein to present a discussion of the detailed operation of the autopilot system of FIG. 1, a brief description of the various major parts and functional operation of this autopilot system will be helpful toward having a full understanding of the invention.

The autopilot control console 10 is located in the cockpit conveniently at hand to the pilot, and includes a plurality of switches for controlling individually the various devices and aspects of operation to be described. Specifically, the console includes on-off switches, actuation of which to the "on" condition places roll, heading (HDG), altitude (ALT) and pitch under automatic control of the autopilot. Also, a thumbwheel is provided for continuous adjustment of pitch and a twist control for continuous roll adjustment.

A pictorial navigation indicator (PNI) 11 also is located in the cockpit and includes a dial which is adjustable to place the aircraft on any desired compass heading by merely dialing in the reference heading. The PNI 11 includes a gyroscope with conventional electrical pickoffs giving electrical signals indicating change from a predetermined orientation. An electric "error" signal is provided as long as the aircraft is not directed along the heading to which the gyro has been preset and a zero or null signal when the aircraft is on the correct heading. The "error" signal is utilized to energize appropriate servomechanisms to turn the aircraft, which turning continues until the proper heading is achieved at which time the gyro signal stops.

The artificial horizon meter 12 develops an attitude reference signal to the remainder of the autopilot system indicating the present attitude of the aircraft. For example, if one wing is lower than the other, a corresponding electric signal will be directed to the appropriate servomechanism to adjust the ailerons and level the aircraft.

The system amplifier 13 has multiple input terminals for receiving relatively small magnitude signals from the various autopilot meters (e.g., PNI 11, horizon meter 12) and raises them to a level sufficient to drive the associated servomechanisms which are devices for readjusting the aircraft flight controls and have a relatively high drive power requirement.

More particularly, the servomechanisms (servos) for adjusting the position of the various aircraft flight controls are devices for producing a controlled amount of movement responsive to an actuating electrical signal. Thus, the roll servo 14 when energized provides the force to adjust the aircraft ailerons position and thereby cause a change of the aircraft orientation about the longitudinal axis of the fuselage (i.e., roll control). Similarly, the pitch servo 15 is similar in construction to the roll servo except that it is interconnected with the elevator or stabulator of the aircraft, thereby controlling the up or down movement as desired, as well as being used in a turn. In the case of a turn, there is a combined actuation of both the pitch and roll servos.

The altitude hold or the altitude hold sensor 16 is selectively adjustable to any desired altitude and produces a corresponding electric reference signal for that selected altitude. Thus, when the altitude hold sensor is set to a particular altitude, it will give out an electric signal to the pitch servomechanism 15 that will be null or zero as long as the aircraft maintains the preset altitude, but any deviation in altitude causes a signal change which will accordingly produce appropriate manipulation of the flight controls by the pitch servo causing the aircraft to reassume the preset altitude.

Figure 2:
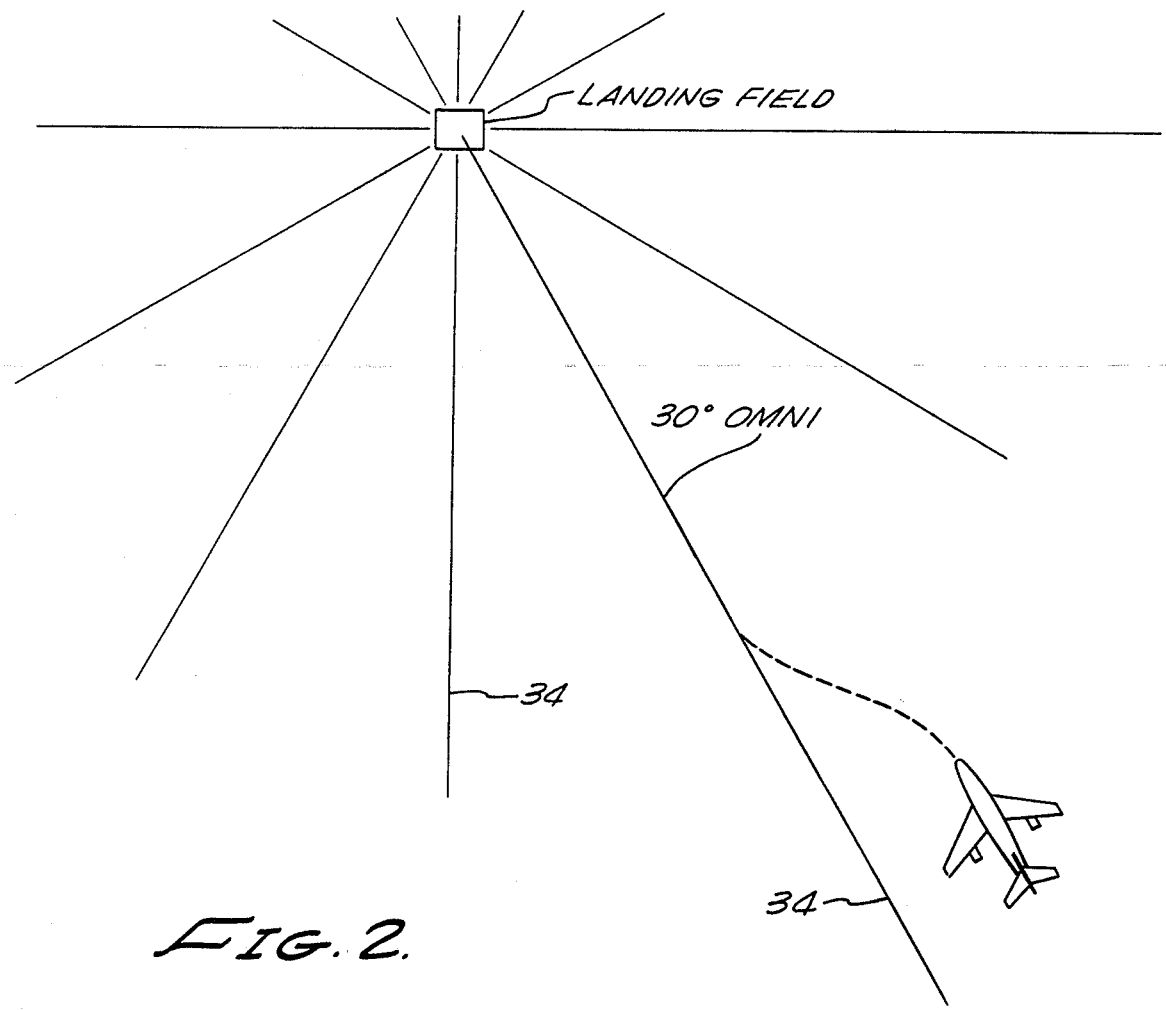
FIG. 2 is a schematic plan representation of an aircraft approaching a landing field and showing several omni radial signals emanating from the field.

The radio coupler 17 is used for electronic navigation in which the aircraft is caused to automatically track along standard omni or localizer beams, and is selectively adjustable to any selected omni radial that it is desired to intercept and follow. More particularly, so-called VOR beams (VHF Omnidirectional Range) are radiated at 30° angular spacing from a source (e.g., landing field) as shown in FIG. 2. An appropriate radio receiver in the aircraft is interconnected with the radio coupler 17 giving an indication of when the aircraft is to the left, to the right or directly on a selected omni (e.g., 30° omni). An indication is also given of whether the aircraft is moving "TO" or "FROM" the omni ground station.

The pictorial navigation indicator 11 and radio coupler 17 are interconnected for common switching to insure coaction during interception of a preselected omni (Navigation or NAV mode) and for disconnecting the PNI thereafter leaving the autopilot under the heading control of the selected omni.

Figure 3:
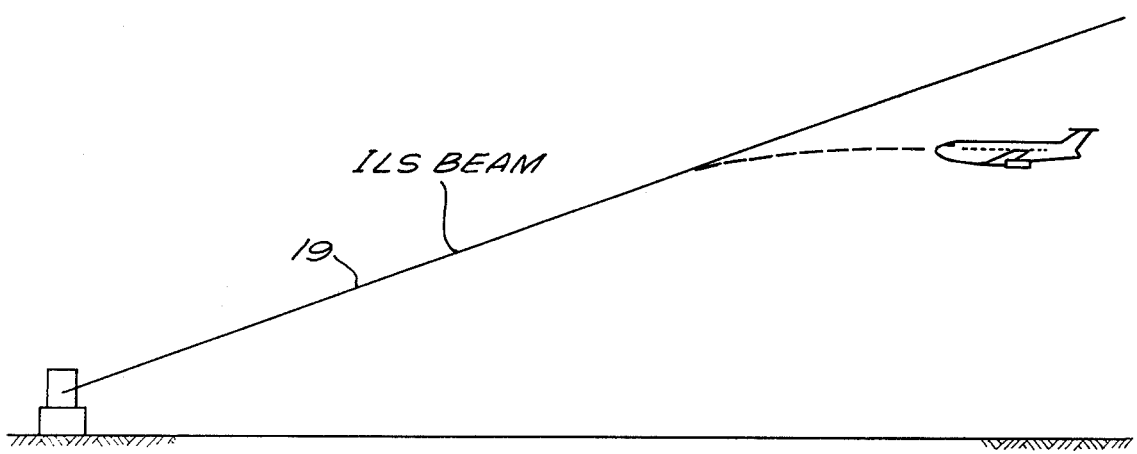
FIG. 3 is a schematic depiction of an instrument landing system transmitting signals for guiding an aircraft along a proper approach for landing.

The glide slope coupler 18 is an analog computer that directs the autopilot system to intercept and track along the glide path defined by the ultrahigh frequency beams of an instrument landing system (ILS) for landing purposes. As shown in FIG. 3, the ILS beam is directed angularly upwardly at a fixed angle with respect to the ground such that if followed down by an aircraft it would be in a proper landing attitude. The glide slope coupler operates in cooperation with the radio coupler 17 such that when so-commanded the aircraft will automatically intercept and track along the ILS beam.

GLIDE SLOPE INTERCEPT

Figure 4:
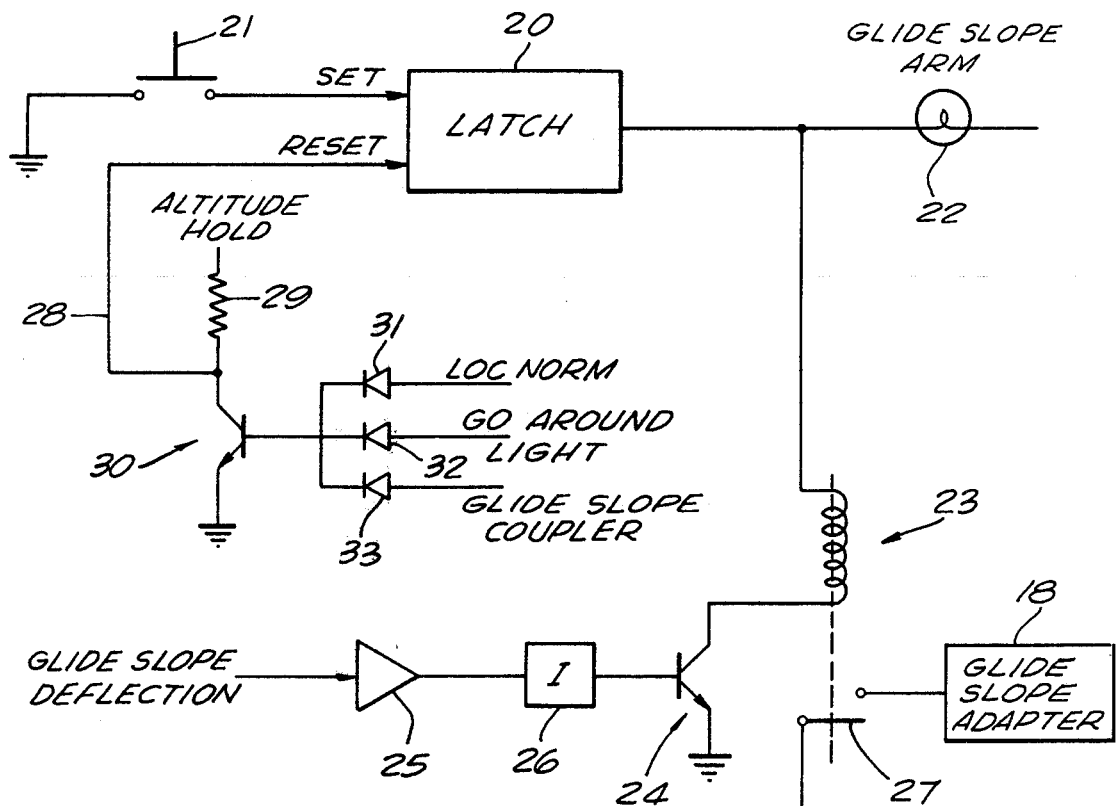
FIG. 4 is a schematic function block diagram of apparatus of the invention for providing variable intercept capability on a glide slope coupled approach.

For the ensuing description reference is made to both FIGS. 3 and 4. As shown, an aircraft under control of its autopilot is approaching the landing field and preparing for a glide slope coupled approach along the glide slope defined by the ILS beam 19. For the previously described conventional autopilot there are three initial requirements for effecting a glide slope coupled approach, namely, (1) the altitude hold 16 must be in operation, (2) the radio coupler 17 must be set to the LOC NORM position which slaves the various servomechanisms to follow the ILS radio beam, and (3) the aircraft must be maintained at 60% under the glide slope for 20-40 seconds. When all three of these conditions are met, the glide slope coupler of the prior art will couple as the aircraft goes through the glide slope 19. As already noted, the last requirement is a difficult one to meet because of crowded airport conditions and it is specifically alleviated by the apparatus of this invention to be described at this time. The first two conditions are still required, however.

With reference particularly to FIG. 4 and assuming the latch 20 to be initially in the Reset condition, depression of a pushbutton 21 interconnects ground to the latch Set input terminal causing the latch output terminal to switch to the up condition energizing the glide slope arm light 22. At the same time, one terminal of the coil of a relay 23 is also energized. The other relay coil terminal is connected to the collector of a transistor 24 having its emitter grounded.

The output of amplifier 25 is fed through an inverter 26 to the transistor base. A signal identified as Glide Slope Deflection is the sole input to amplifier 25, and is a signal normally available in the glide slope coupler 18 when the aircraft is within receiving range of the ILS and specifically can be either an "up deflection" when the aircraft is below the ILS beam or a "down deflection" when the aircraft is above the beam. A deflection signal will cause the transistor 24 to conduct thereby permitting relay 23 to the picked up. When this is accomplished, the normally-open relay point 27 closes to interconnect and activate the glide slope adapter portion of the coupler 18 placing the aircraft under immediate automatic control of the autopilot to track the beam 19 in for landing.

The glide slope adapter 18 will stay in full operation until the latch 20 is reset by a signal input to the reset terminal along line 28. Line 28 interconnects with the common point of resistor 29 and the controller of transistor 30, the emitter of which is grounded. The open end of resistor 29 is interconnected with the altitude hold 16 such that when the altitude hold is energized, a signal is presented to the transistor collector. Three individual signals are OR-gated via respective diodes 31-33 to the transistor base. Accordingly, one way to reset the latch 20 is when the ALTITUDE HOLD is up, and any one or more of the three OR-gated signals are present. Specifically, when the LOC NORM switch on the radio coupler is open, an up signal is presented to diode 31, when the GO-AROUND LIGHT is on (this is a condition indicating that the aircraft is being manually flown and will be described later herein) a signal is presented to diode 32, and when the glide scope coupling has been actually achieved a signal is presented to diode 33 (the latter signal is most easily obtained from a light provided on the glide slope coupler which is energized on coupling). Restating one set of conditions for reset, the ALTITUDE HOLD is in operation and either LOC NORM switch is off, the GO-AROUND light is on, or Glide Slope coupling has actually been achieved.

Alternatively, if the Altitude Hold is turned off, this resets the latch 20. Resetting in either manner turns off the glide slope arm light 22 and disconnects the glide slope adapter 18 by dropping out relay 23.

VARIABLE ANGLE INTERCEPT

Turning now to FIG. 2, an aircraft is shown on a heading that is along a course not aligned with any one of the VOR beams indicated as a plurality of angularly equally spaced lines 34 emanating from a transmitter shown located at a landing field for the aircraft.

When in the navigation (NAV) mode, the autopilot automatically controls the aircraft to align and track along a selected radial. VOR stations are variously located across the country for navigation purposes.

The autopilot radio coupler 17 provides a heading signal corresponding to the direction of the course to be flown. The heading signal is summed with what might be termed a radio deviation signal such that radio deviations will produce a heading deviation. In operation, the radio coupler is switched on (NAV mode) and a particular VOR radial is selected (e.g., 30°). The autopilot will then automatically turn the aircraft to intercept the selected radial at a 45° angle. This is satisfactory as long as there is no other traffic in the immediate vicinity, air traffic control has not commanded you to maintain a particular heading until interception of the radial, or there are no other obstacles along the path of the turn.

For example, if air traffic control is directing you, you must stay in the heading mode and watch the radio instruments until it is indicated that the aircraft is approaching the given radial, at which time you can then switch to the NAV mode. Of course, during this whole time the pilot must be alert for other traffic and perform such other duties as may arise.

As will be described more fully later herein, in the practice of this invention the pilot selects the heading he desires to follow (or has been instructed to follow by air traffic control), the radial it is desired to intercept (30°), and radio instruments will be monitored electronically to switch to the NAV mode at the proper time. The pilot is, therefore, free for other duties including watching for other traffic.

Figure 5:
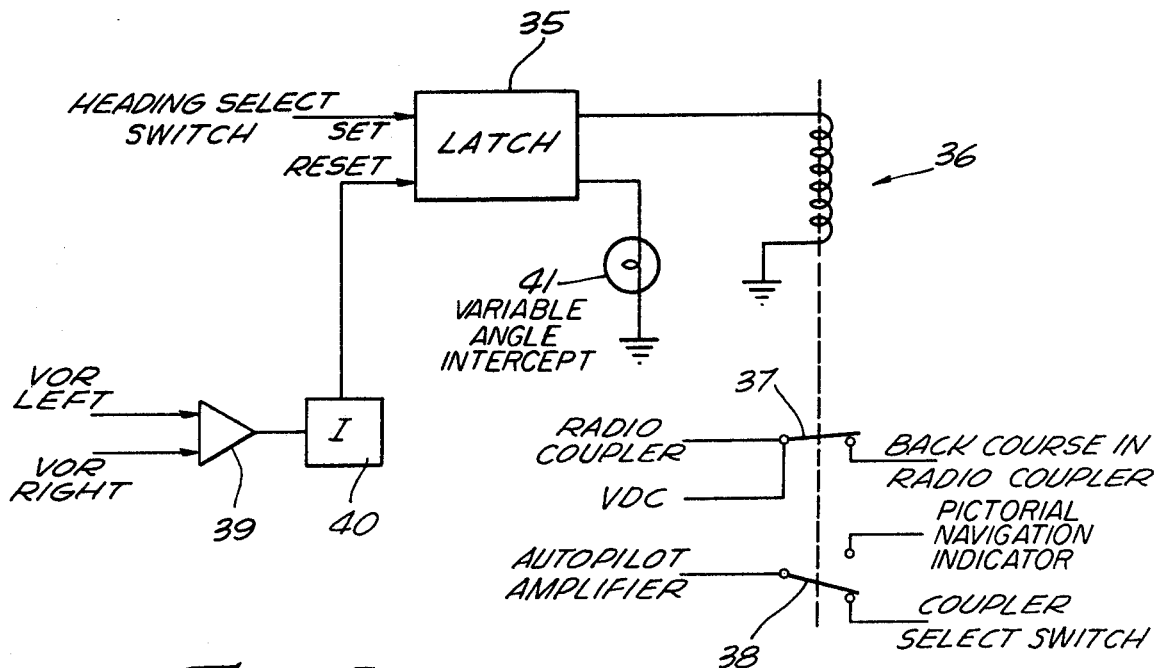
FIG. 5 is a schematic function block diagram of apparatus of the invention for interrupting automatic pilot operation during approach for landing and performing a go-around.

Reference is now made to FIG. 5 for the ensuing description of the variable angle intercept circuit of this invention. When the HDG switch is actuated on the radio coupler 17 this "sets" a latch 35 which pulls in relay 36. Energization of relay 36 opens relay points 37 to break the connection between the "back course" parts of the radio coupler and the remainder of the radio coupler and the common power supply as well. The second set of relay points 38 on transfer disconnects the radio coupler select switch (which was initially set to the NAV mode) from the autopilot amplifier 13 and at the same time connects the autopilot amplifier to the PNI 11 through the radio coupler so that electronically the radio coupler is in the heading mode. Accordingly, with the latch 35 in the set condition the autopilot is following the heading commands of the PNI although the radio is fully operational but not directly controlling, and will stay in this mode of operation until the latch 35 is reset.

In the radio coupler 17 there are present signals representing the relative position of the aircraft vis-a-vis being left or right of the selected VOR radial. For example, if the aircraft were directly on a selected radial the left and right signals would be equal, while on approaching a radial from the side will be accompanied by a changing ratio of the left and right signals. These left and right signals are fed into the input of an algebraic summing amplifier 39 providing an output signal proportional to the difference which is acted upon by an inverter 40 to form a reset for the latch 35. When the relative values of the left and right VOR signals reaches a value that has been determined as indicative of a proper intercept being made, the latch 35 is reset dropping relay 36 out which returns the autopilot to automatic control by the radio coupler and interrupts heading control by the PNI. A variable angle intercept light 41 is accordingly energized when the radio coupler is not set in the heading mode by its switch, but still following the heading bug. The light 41 is not on when the radio coupler is set to HDG or when the selected radial has been intercepted.

GO-AROUND

As has already been noted, due for example to other traffic in the area, unusual obstacles preventing maintenance of a given course, or other reasons, it may be advisable not to continue on to landing at a field but to circle the field and make a further and later approach. This is usually referred to as a go-around or a fly-around. In order to accomplish this, it is necessary to interrupt the autopilot and take over the control of the aircraft manually throughout the fly-around or go-around. Assume for detailed description of the circuit of FIG. 6, for example, that the aircraft has come within range of the ILS beams but because of the intrusion of other traffic in the vicinity, it is necessary to interrupt locking on to the beams and to make a go-around. It is clear that since a go-around can be caused by a number of different circumstances, that the aircraft attitude and altitude at the instant of interrupting autopilot control and assuming manual control, may vary considerably. There are two major problems or dangers that may be encountered when the aircraft is switched off to autopilot to make a go-around. First of all, if the aircraft happens to be at the time of go-around at a relatively low altitude and it were suddenly switched to a descending pitch, there would be the obvious danger of crashing. On the other hand, upon switching to a go-around at a given speed, if the aircraft were switched to too high a pitch or climbing angle, this could tend to cause the aircraft to stall Even if the pitch wheel is preset to an appropriate climbing angle, it can easily be inadvertently disturbed, such as hitting with a hand or arm, while the aircraft has been on autopilot so that at the immediate moment of changeover to go-around, it may be misadjusted to some unacceptable value.

Figure 6:
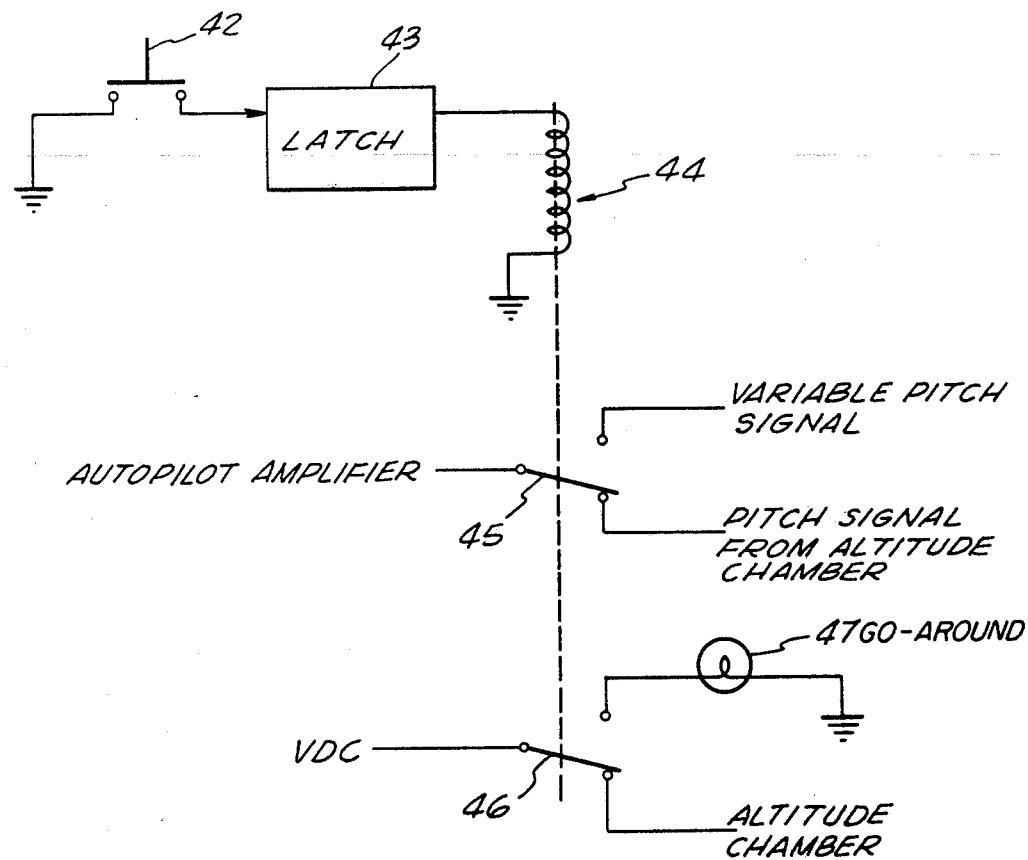
FIG. 6 is a function block schematic apparatus of the invention for automatic switching of an autopilot from a heading mode to the navigational mode.

Turning now to FIG. 6, it is to be noted that the circuit of this aspect of the invention includes generally a relay which when energized interrupts two circuits, namely, the pitch signal provided from the altitude chamber to the autopilot amplifier and also the interconnection from the altitude chamber to a power supply indicated as VDC. That is, a first functional operation of the circuit to be described is to remove the pitch signal provided by the altitude chamber and thus the pitch wheel from its controlling relationship with respect to the autopilot amplifier and remove the power from the altitude chamber. In addition to disrupting the referenced circuits, a signal light is energized showing that the aircraft is in the GO-AROUND mode and a selectively variable pitch signal is interconnected with the autopilot amplifier.

With respect to detailed aspects, the circuit of FIG. 6 includes a pushbutton 42 interconnected between electrical ground and the input to a latch 43, which latch is of the variety that will produce a changed output condition for each impulse to its input. That is, a first impulse to the latch may produce a continuing "up" condition to the latch output and a second pulse will produce a continuing "down" condition. The latch output is interconnected with one terminal of a relay coil 44, the other end of which connects to electrical ground. A first relay point 45 is normally closed interconnecting the autopilot amplifier and the pitch signal from the altitude chamber which is the normal situation under the autopilot system. Transfer of the point 45 on energization of 44 interconnects a selectively variable pitch signal to the autopilot amplifier. Specifically, the variable pitch signal is a signal of predetermined value of place the aircraft at a best rate of climb for travel over the ground. This value of the pitch signal will therefore avoid the possibility of diving and the concomitant danger of crashing when the aircraft is closed to the ground and also will prevent climbing at too steep an angle with the possible result of stalling.

A second relay point 46 is normally closed to provide electrical power to the altitude chamber and on transfer when the relay is energized, it interconnects the electrical power to the GO-AROUND light 47 the other terminal of which is grounded. The transferred condition both as to the light and the variable pitch signal is continued as long as the latch remains in its energized condition. Once the go-around is completed and the aircraft is once more back to its original, or perhaps on some other desired approach, the pushbutton 42 is depressed once again which drops the latch out and causes the relay to reassume its de-energized condition with the points transferred to the position shown in FIG. 6 whereby the autopilot is once more in control of the aircraft.

I claim:

1. In an aircraft autopilot system having a pictorial navigation indicator selectively adjustable to different headings and providing an electric signal representative thereof; an artificial horizon indicator providing a signal corresponding to unbalanced altitude of the aircraft; a radio coupler selectively adjustable to provide a controlling signal to follow a course defined by an omni, ILS beams (LOC NORM), preset heading of a pictorial navigation indicator or to seek out a predetermined omni (NAV); an amplifier having inputs for receiving the recited electric signals and outputs interconnected with a pitch servosystem and a roll servosystem for adjusting the controls of the aircraft; and altitude hold means selectively adjustable to provide signals corresponding to different altitudes which are fed into the amplifier for automatically positioning the aircraft to the selected altitude; and a glide slope coupler including a glide slope adapter interconnected with the artificial horizon indicator and altitude hold for cooperative action with the radio coupler to track the aircraft along ILS beams for landing; and a console including first switches for selectively connecting and disconnecting the amplifier with individually adjustable roll and pitch signal means, and second switches for selectively connecting and disconnecting the altitude hold and heading from the pictorial navigation indicator and radio coupler, the improvement comprising:

first means selectively actuatable to connect the glide slope adapter to electrical power during the existence of a glide deflection signal, said glide slope adapter being disconnected from electric power when either (a) the altitude hold is inoperative, or (b) the altitude hold is operative and at least one of the following exists: the radio switch LOC NORM is off, or glide slope coupling has been achieved;

second means for maintaining the autopilot under control of the preset heading on the pictorial navigation indicator when the radio coupler is preset to NAV including third means for placing the automatic pilot under control of the radio coupler and interrupting heading control by the pictorial navigation indicator upon actual intercept of a selected omni occurring; and selectively actuatable fourth means for disconnecting the console pitch signal from the amplifier and interconnecting a pitch signal of predetermined fixed magnitude to said amplifier, and further means simultaneously actuated for energizing a GO-AROUND light.

2. A system as in claim 1, in which said first means includes a latch having set and reset input terminals and an output terminal, a switch interconnecting the set terminal with a signal source such that actuation of the switch energizes the latch output terminal, a light source connected to the latch output terminal, one end of a relay coil connected to the latch output terminal and the end of the relay coil electrically completed through switching means controlled by a glide slope deflection signal whereby the relay coil is energized when both the latch is set and a glide slope deflection signal is present, a normally open point of said relay which is closed on energization of the relay coil to interconnect the glide slope adapter with a source of electrical power.

3. A system as in claim 2, in which the latch reset terminal is interconnected to a switching circuit providing a reset signal when (a) the altitude hold is down or (b) the altitude hold is up and any or all of (i) LOC NORM switch is open, (ii) GO-AROUND light is energized, and (iii) glide slope coupling is achieved.

4. A system as in claim 1, in which said second means includes set input and output terminals and reset input and output terminals, a light source interconnected to the latch reset output terminal, a relay coil interconnected with the latch set output terminal for energization thereby, a normally closed relay point interconnecting the autopilot amplifier with coupler select switch, on transfer interconnects said amplifier and the heading signal from the radio coupler.

5. A system as in claim 4, in which the latch reset input terminal is connected to the output of a summing amplifier the inputs to said summing amplifier being the VOR left and right signals provided via the radio coupler, and said latch reset input terminal being actuated on a predetermined ratio of said left and right signals being obtained.

6. A system as in claim 1, in which said fourth means includes a latch with an input and an output, successive impulsing of said latch input alternating the latch output from up to down, a momentary impulsing means connected to the latch input, a relay coil connected to the latch output, a first normally closed relay point interconnecting the amplifier to the console pitch signal which transfers to interconnect the amplifier with a predetermined fixed pitch signal, and a second normally closed point interconnecting an electric power source with the altitude hold and on transfer interconnects the electric power source with a signal light.

* * * * *